(12) United States Patent
Schlipper et al.

(10) Patent No.: US 12,038,037 B2
(45) Date of Patent: Jul. 16, 2024

(54) FASTENER

(71) Applicant: MRM HK LIMITED, Western District (HK)

(72) Inventors: Robert Wesley Schlipper, Western District (HK); Luke James Ritchie, Yuen Long (HK)

(73) Assignee: MRM HK Limited, Western District (HK)

( * ) Notice: Subject to any disclaimer, the term of this patent is extended or adjusted under 35 U.S.C. 154(b) by 19 days.

(21) Appl. No.: 17/924,525

(22) PCT Filed: May 14, 2021

(86) PCT No.: PCT/CN2021/093774
§ 371 (c)(1),
(2) Date: Nov. 10, 2022

(87) PCT Pub. No.: WO2021/228214
PCT Pub. Date: Nov. 18, 2021

(65) Prior Publication Data
US 2023/0175546 A1 Jun. 8, 2023

(30) Foreign Application Priority Data
May 14, 2020 (HK) .......................... 32020007529.1

(51) Int. Cl.
*F16B 45/04* (2006.01)
(52) U.S. Cl.
CPC ................................. *F16B 45/049* (2021.05)

(58) Field of Classification Search
CPC .... F16B 45/049; F16B 45/035; F16B 45/051; Y10T 24/45293
See application file for complete search history.

(56) References Cited

U.S. PATENT DOCUMENTS

| | | | | |
|---|---|---|---|---|
| 302,509 | A * | 7/1884 | Mauthner | F16B 45/051 24/600.6 |
| 311,941 | A * | 2/1885 | Armstrong | F16B 45/049 24/600.6 |
| 1,299,821 | A * | 4/1919 | Carpmill et al. | F16B 45/026 24/598.5 |

(Continued)

FOREIGN PATENT DOCUMENTS

| | | |
|---|---|---|
| CN | 201363358 | 12/2009 |
| CN | 1098640403 | 6/2019 |

(Continued)

*Primary Examiner* — Robert Sandy
*Assistant Examiner* — Louis A Mercado
(74) *Attorney, Agent, or Firm* — Renner, Kenner, Greive, Bobak, Taylor & Weber (57) ABSTRACT

A fastener for releasably securing a member including a body including a shank and a recess, the recess configured for receiving the member. A gate is mounted to slide axially on the shank between a closed position closing a mouth of the recess for retaining the member, and an open position. Resilient means engages the gate and the shank to urge the gate to the closed position, and latches are mounted on opposing sides of the gate, wherein each latch is self-closing and engages the body for holding the gate in the closed position providing an auto-locking fastener that, for greater security, requires three independent actions for release.

22 Claims, 6 Drawing Sheets

(56) References Cited

U.S. PATENT DOCUMENTS

| | | | | |
|---|---|---|---|---|
| 2,010,277 A * | 8/1935 | Smith | ............... | F16B 45/049 24/905 |
| 3,235,928 A * | 2/1966 | Clark | ............... | D06F 55/02 24/517 |
| 3,413,692 A * | 12/1968 | Pressley | ............... | F16G 11/10 24/640 |
| 3,927,741 A | 12/1975 | Rubinstein | | |
| 3,952,382 A * | 4/1976 | Vaage | ............... | F16B 45/06 24/598.5 |
| 5,430,914 A | 7/1995 | Patterson et al. | | |
| 5,867,877 A | 2/1999 | Patterson et al. | | |
| 5,915,631 A | 6/1999 | Laxton et al. | | |
| 6,360,408 B1 | 3/2002 | Dykstra et al. | | |
| 6,820,310 B2 * | 11/2004 | Woodard | ............... | B60R 22/30 297/476 |
| 6,884,012 B2 | 4/2005 | Panasik | | |
| 6,962,394 B2 * | 11/2005 | Anthony | ............... | B60R 22/105 297/250.1 |
| 7,752,721 B2 | 7/2010 | Lin | | |
| 8,365,365 B2 * | 2/2013 | Schlipper | ............... | F16B 45/045 24/265 H |
| 8,485,402 B2 * | 7/2013 | Smith | ............... | F41B 5/1461 224/916 |
| 8,646,158 B2 | 2/2014 | Buckingham et al. | | |
| 8,646,766 B2 * | 2/2014 | Shrock | ............... | B25B 5/08 269/143 |
| 2004/0195900 A1 * | 10/2004 | The | ............... | A44B 11/2534 297/463.2 |
| 2016/0286909 A1 | 10/2016 | Izzo | | |

FOREIGN PATENT DOCUMENTS

| | | | | |
|---|---|---|---|---|
| GB | 1180293 | | 2/1970 | |
| GB | 1180293 A * | | 2/1970 | ............. F16B 45/04 |
| WO | 2004002867 | | 1/2004 | |
| WO | 2020097584 | | 5/2020 | |

* cited by examiner

FASTENER

TECHNICAL FIELD

The present invention relates to fasteners, particularly auto-locking gated fasteners that require multiple independent actions for release, so as to provide protection against unintentional release.

BACKGROUND OF THE INVENTION

U.S. Pat. No. 8,365,365B2 describes a hook fastener with a sliding gate urged by a spring to close the mouth of the hook. It may be used for releasable fastening of elongate flexible members such as belts, slings, tethers, lines, ropes, chains, and the like. A drawback of this fastener is the separate manual action that the user must perform—turning the keeper—to place the gate in its latched closed state. It will therefore be understood that a need exists to provide a higher degree of security or protection against unintentional release that would be available if the need for this separate manual action could be avoided. It is an object of the present invention to address the above need or, more generally, to provide an improved auto-locking gated fasteners.

DISCLOSURE OF THE INVENTION

According to one aspect of the present invention there is provided a fastener for releasably securing a member, the fastener comprising:
  a body including a shank and a recess, the recess configured for receiving the member;
  a gate mounted to slide axially on the shank between a closed position closing a mouth of the recess for retaining the member, and an open position;
  resilient means engaging the gate and the shank to urge the gate to the closed position, and
  a pair of latches, the latches mounted on opposing sides of the gate, wherein each latch is self-closing and engages the body for holding the gate in the closed position.

The resilient means preferably comprises a member or assembly that is resilient, such as a spring (for instance, a helical spring, a leaf spring, a cantilever spring, a gas spring), an elastic member (such as an elastomeric block), or the like.

The latches may be of any known type of latch, such as a sliding latch, a pivoting latch, or a combined sliding and pivoting latch, and may be made self-closing through the provision of resilient latch-closing means such as a spring (for instance, a helical spring, a leaf spring, a cantilever spring, a gas spring), an elastic member (such as an elastomeric block), or the like.

Preferably the recess is disposed proximate one longitudinal end of the body.

Preferably the recess is defined by a hook-shaped portion of the body. Preferably the hook-shaped portion has a non-reentrant form.

Preferably the latches are alike, each latch comprising a latch lever mounted by a pivot to rotate about a respective substantially transverse pivot axis.

Preferably the latch levers are elongated generally axially and both substantially transverse pivot axes substantially lie in a transverse plane.

Preferably the pivot axes are disposed intermediate opposite first and second ends of the latch levers, one of the first and second ends of each latch lever abutting a shoulder on the shank.

Preferably a slot extends through the shank and is substantially axially aligned, opposing ends of a latch spring received in the slot abut respective ones of the latch levers to urge the one of the first and second ends inwardly.

Preferably the second ends project from a concave circumferential surface of the gate, most preferably from a conical concave surface.

Axles may be held in respective apertures in the body, each axle pivotably supporting one of the latch levers. However, preferably a one-piece retainer extends through each latch lever to define each pivot.

Preferably channels in a periphery of the gate receive sections of the one-piece retainer.

Preferably the one-piece retainer comprises a length of wire formed first in a U-shape with two parallel arms that are inserted through the latch levers before ends of the arms are bent together to form a loop to permanently retain the latch levers and latch spring.

Preferably the resilient means comprises a helical spring that extends about the shank, one end of the helical spring engaging the gate and the other end engaging a fixture proximate one end of the shank.

Preferably the fixture is held in an aperture that extends substantially transversely through the shaft.

Preferably the fixture comprises one end of an elongate flexible member, such as a wire rope.

This invention provides a fastener which is effective and efficient in operational use, and which by requiring three independent release actions (two separate latches and sliding of the gate) and automatic locking offers protection against unintentional release.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Referring to FIGS. 1 to 5, a first embodiment of a fastener 10 according to the invention generally comprises an elongate body 11 with a recess 12 formed proximate a first longitudinal end 14 and a shank 13 that may extend to an opposing longitudinal end 15. The first longitudinal end 14 may consist of a hook-shaped portion of the body 11 that defines the recess 12. The body 11 may have a generally elongate form with both ends 14, 15 having a like cross section. The recess 12 extends generally transversely and may taper to narrow in the longitudinal direction from an elongate mouth 16 aligned approximately with the outer surface of the shank 13 to its closed end 17. The closed end 17 may be concave and define a radiused face. The recess 12 may be relatively shallow in transverse dimension, so as not to extend across an imaginary central longitudinal plane of the body 11 (not shown). A slot 18 may extend through the body 11, and may be elongated longitudinally and intersect, at least partially, with the recess 12. Near an inner end of the slot 18 the body includes transversely opposing shoulders 36. Planar faces 19 may be provided on an exterior of the body 11 and aligned longitudinally. An aperture 20 may extend transversely through the longitudinal end 15.

Figures 1, 1A, 2:
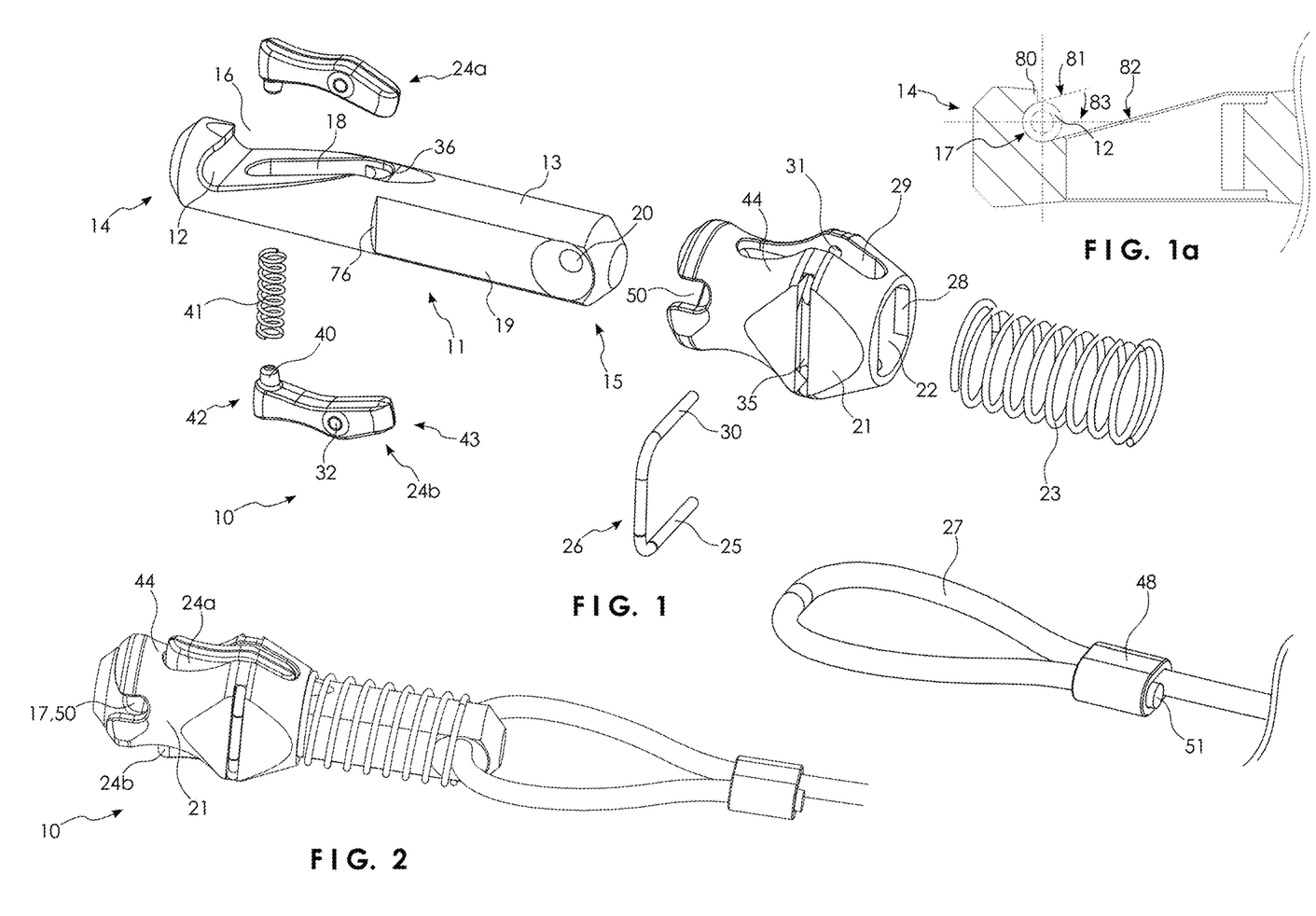
FIG. 1 is an exploded view of a first embodiment of the fastener of the invention.
FIG. 1*a* is a fragmentary section in a longitudinal plane through one end of the body of the fastener of FIG. 1.
FIG. 2 is a perspective view of the fastener of FIG. 1 assembled in the closed position.
Figure 3:
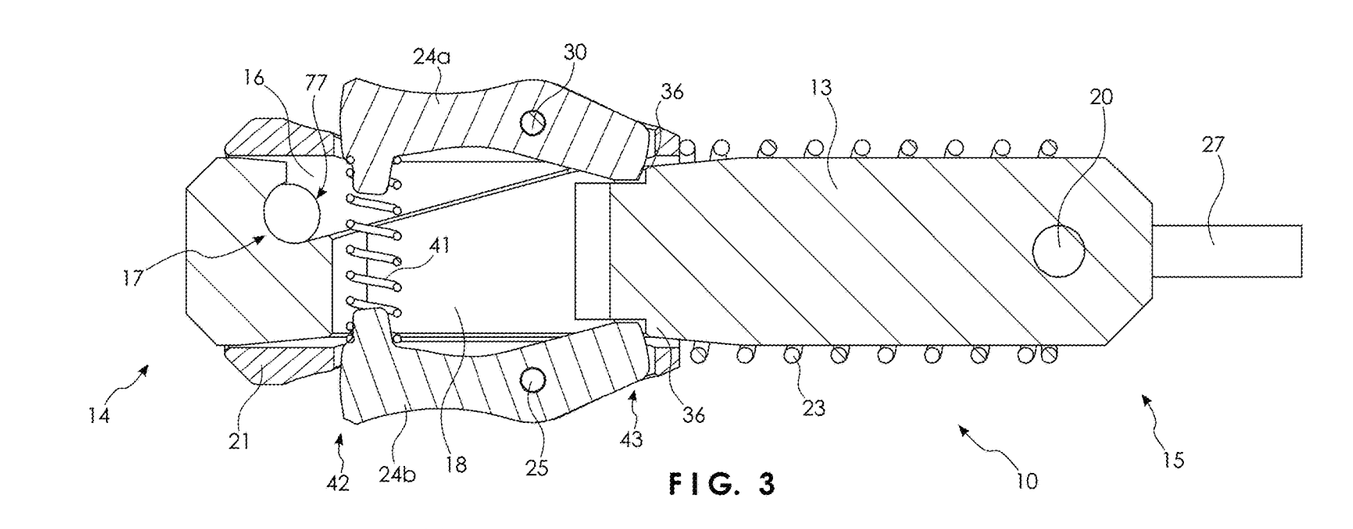
FIG. 3 is a section in a central longitudinal plane through the fastener of FIG. 2.

The hook-shaped portion of the end 14 of the body 11 may have a non-reentrant form, as best seen in FIG. 1a. At a tip of the free end 80 of the hook-shaped portion, the surface of the recess 12 defines a tangent 81. The tangent 81 may be approximately parallel to an opposing face 82 of the recess 12 (or opened from that angle) to provide the non-reentrant form, avoiding the need for the member received in the recess 12 to pass through a throat section before reaching the closed end 17. This shape is distinguished from a re-entrant form (not shown) in which the tangent 81 is closed, by rotation in the direction 83, such that the free end 80 bounds a throat section of the recess 12. The fastener 10 further comprises a gate 21, resilient means in the form of a compression spring 23, a pair of latch levers 24a, 24b, a one-piece retainer 26 and a tether 27.

Figure 4:
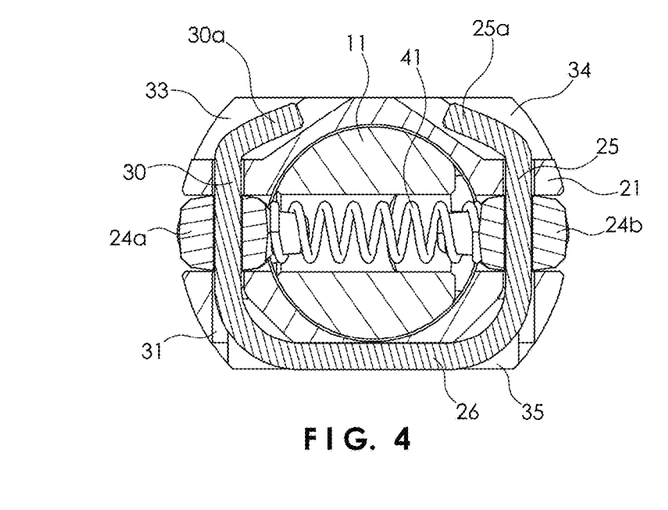
FIG. 4 is a cross section through the fastener of FIG. 2.
Figure 5:
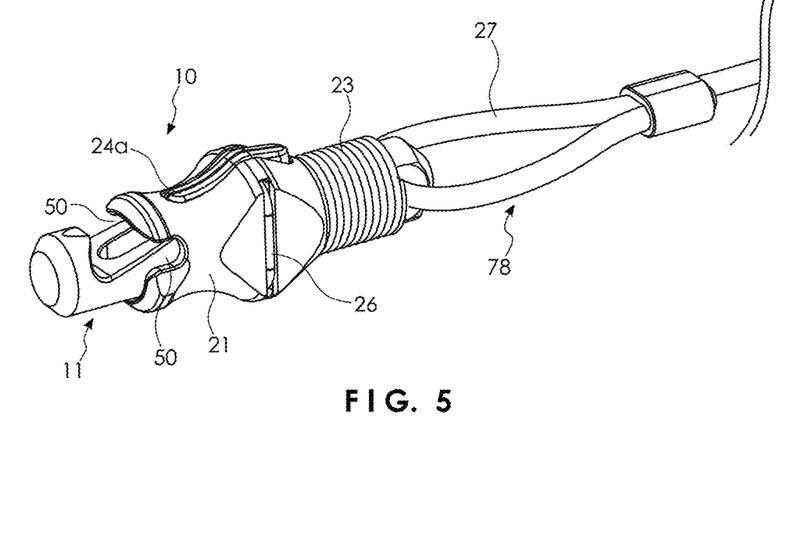
FIG. 5 is a perspective view of the fastener of FIG. 2 in the open position.

The gate 21 has a sleeve-like form with a central opening 22 complementary to the shank 13 which is received therein such that the gate 21 can slide axially on the shank 13 between the closed position (FIGS. 2 and 3) where it closes the mouth 16 by extending over it, and an open position (FIG. 5) where the gate 21 is retracted to expose part of the mouth 16 for the insertion of a member (not shown) therein. Thus, in the closed position, the recess 12 bounds a transversely extending through-hole. Internal abutments 28 in the aperture 22 may be provided for engagement with the faces 19 to prevent rotation of the gate 21, and to abut stop facets 76 (as in the closed position) and thereby limit the travel of the gate 21 toward the end 14 of the body 11. Axially aligned slots 29 may extend through diametrically opposing sides of the gate 21 to receive respective ones of the latch levers 24a, 24b. Transversely opposing concavities 50 in the outer axial end of the gate 21 may be provided for registration, in the closed position, with the closed end 17 such that a member (not shown) that is received in the recess 12 and elongated transversely also projects through both concavities 50. For receipt in the recess 12, the member may be another length of wire rope, a pin, a D-ring or a chain link, or the like, which includes an elongate section, as with a cross-section of substantially constant diameter throughout its length. Opposing longitudinal edges of the elongate section may be disposed adjacent the concave closed end 17 and the opposing concave ends 77 of the concavities 50. Depending upon the transverse dimensions of the elongate section and the limit the travel of the gate 21 toward the end 14, the elongate section may be clamped between the ends 17, 77 and effectively loaded in double shear, or it may be free to move transversely relative to the fastener 10. The one-piece retainer 26 may be formed of wire initially in a U-shape, as shown in FIG. 1, with two parallel arms 25, 30 that each provide a pivot to support one of the latch levers 24a, 24b. The two parallel arms 25, 30 are inserted through respective openings 31 in the gate 21 and through openings 32 in the latch levers 24a, 24b before ends 25a, 30a of the arms 25, 30 are bent together to form a loop to permanently retain the latch levers 24a, 24b. Channels 33, 34, 35 in a periphery of the gate 21 receive sections of the one-piece retainer 26 such that it is recessed within the periphery of the gate 21, as best seen in FIG. 4. In this manner pivot axes of both levers substantially lie in the same transverse plane.

The latch levers 24a, 24b are alike, with the opening 32 defining the pivot axis disposed intermediate first and second longitudinal ends 42, 43. The first end 42 of each latch lever may include a nub 40 that receives one end of a spring 41, while the second end 43 is configured to abut one of the shoulders 36 in the closed position. In this way, the spring 41 acts to urge the ends 42 apart and the ends 43 inwardly, making the latch levers 24a, 24b self-closing. FIG. 2 perhaps best shows the second ends 42 of the latch levers 24a, 24b projecting from a circumferential surface 44 of the gate 21 that a conical concave form, an ergonomic feature to provide for comfortable location of a users thumb and fingers over the top of the latch levers 24a, 24b.

The helical compression spring 23 extends about the shank 13 and has one end that may engage the gate 21 and another end that may engage a fixture in the form of a wire rope 27, or a like elongate flexible member, proximate the longitudinal end 15. In this embodiment, the end of the wire rope 27 is formed in a loop 78 that passes through the aperture 20 and formed by the wire rope 27 being turned back on itself and permanently fixed to itself, as by a crimp 48. The end 15 of the body 11 may be crimped directly to the wire rope 127 at the end of the loop 78 for preventing any relative movement between the body 11 and wire rope 127, such as sliding of the wire rope 27 through the aperture 20.

Figures 6, 7, 8:
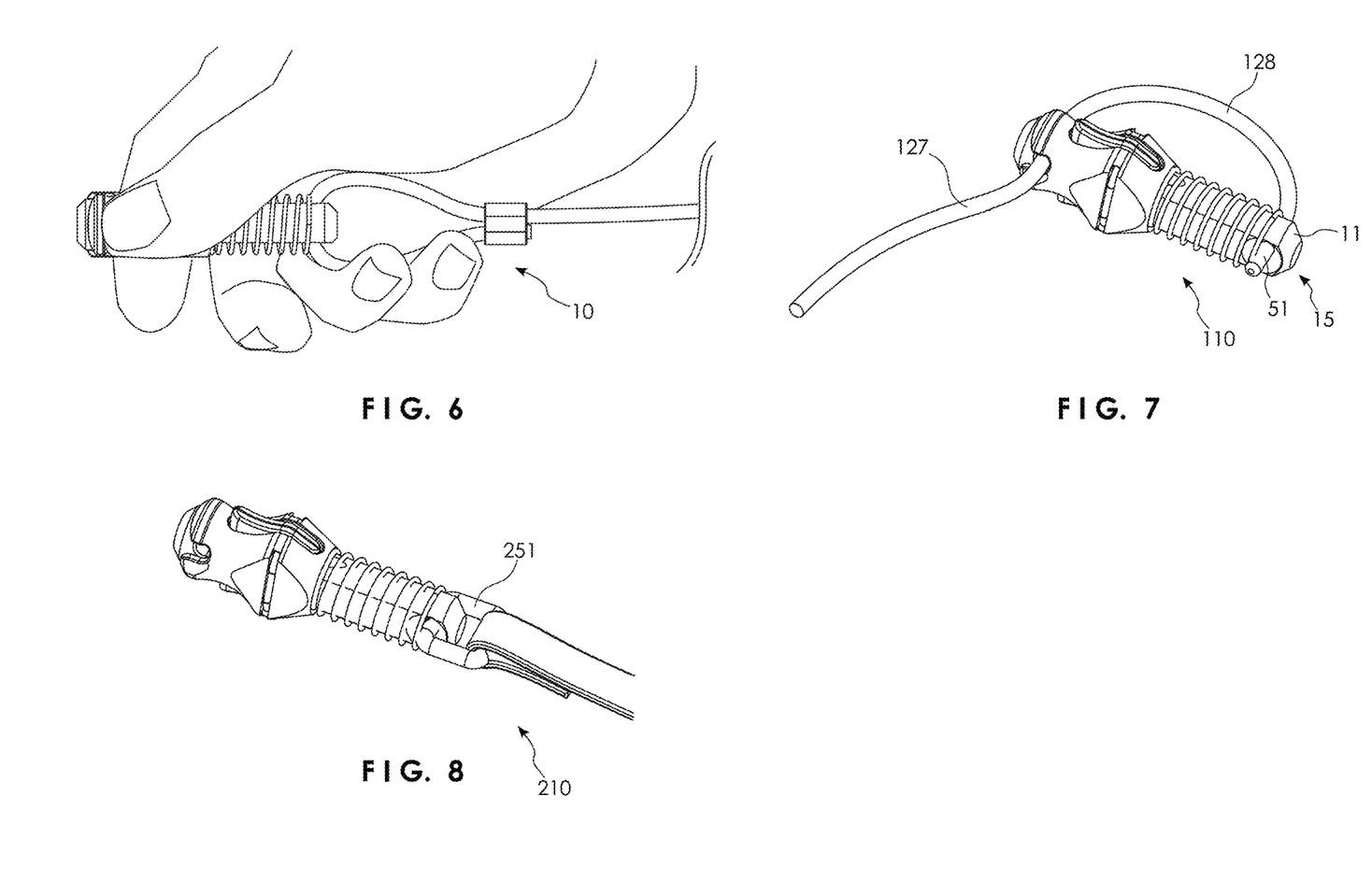
FIG. 6 is a schematic showing single-handed operation of the fastener of FIG. 1.
FIG. 7 is a perspective view of a second embodiment of the fastener of the invention.
FIG. 8 is a perspective view of a third embodiment of the fastener of the invention.
Figure 9:
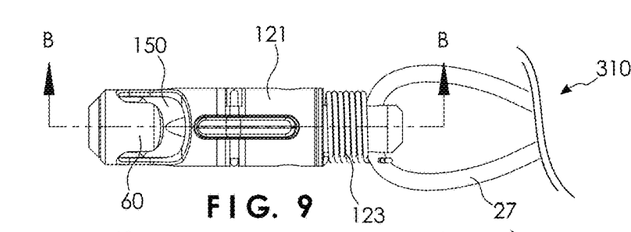
FIGS. 9 and 10 are plan and side views respectively of a fourth embodiment of the fastener of the invention.
Figure 10:
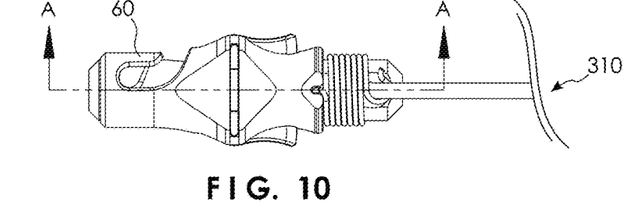
Figure 11:
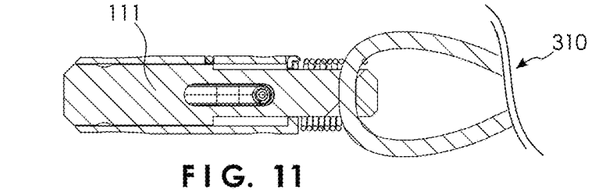
FIGS. 11 and 12 are sections BB and AA respectively of FIGS. 9 and 10.
Figure 12:
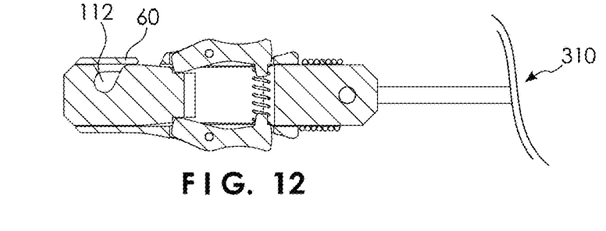
Figure 13:
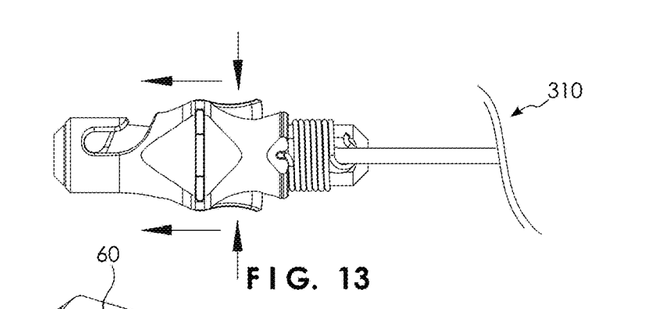
FIG. 13 is FIG. 10 modified to include arrows showing the sliding movement of the gate to open the fastener.
Figures 14, 15:
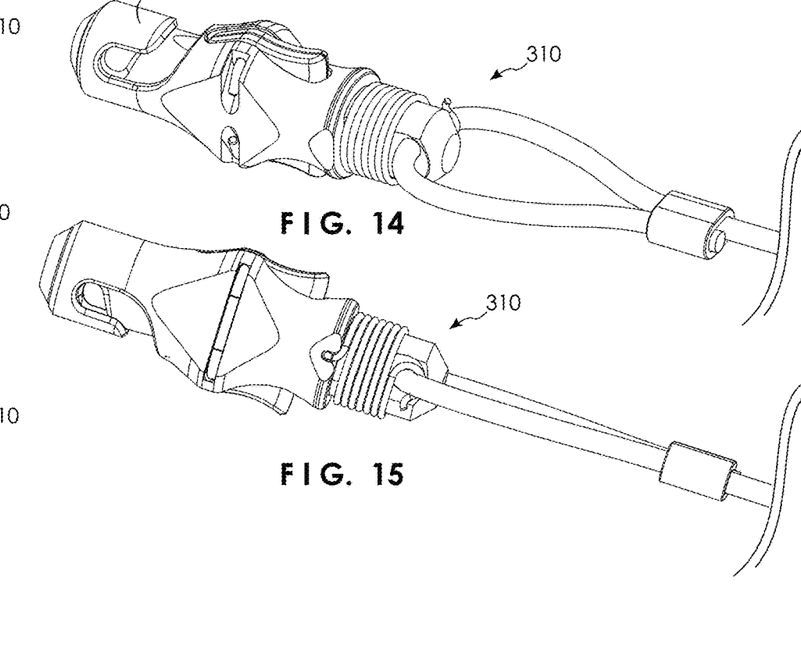
FIGS. 14 and 15 are top and side perspective views respectively of the fastener of FIG. 9.
Figure 16:
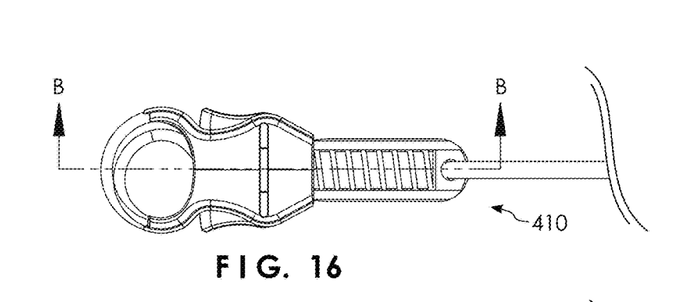
FIGS. 16 to 22 show a fifth embodiment of the fastener of the invention.
Figure 17:
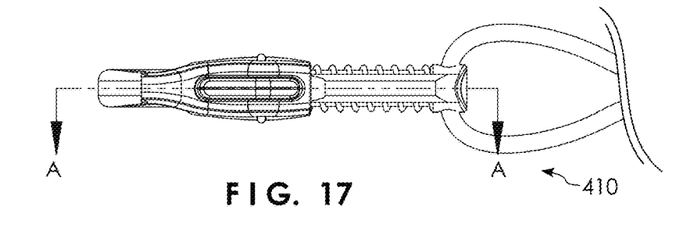
Figure 18:
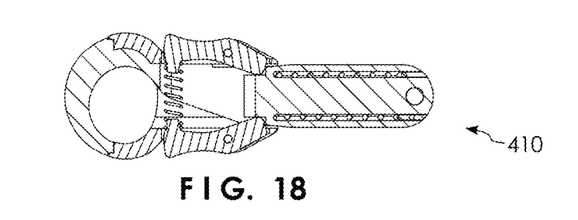
Figure 19:
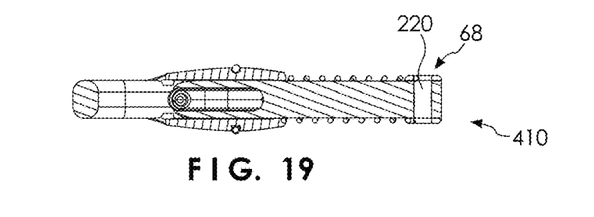
Figure 20:
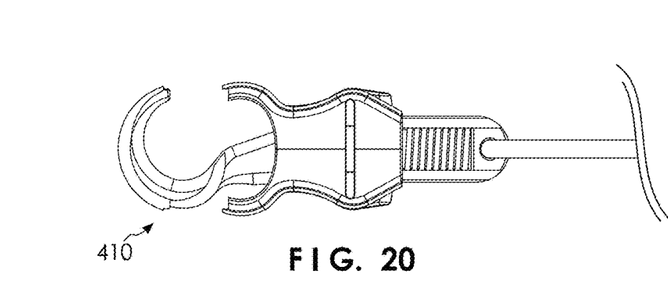
Figure 21:
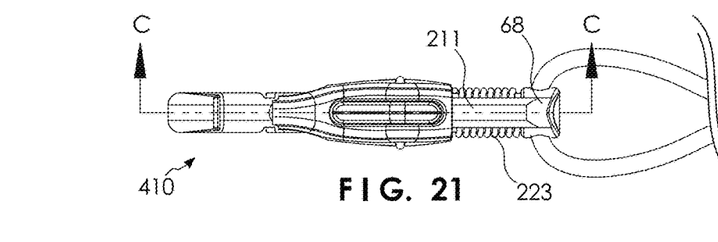

Since the latch levers 24a, 24b have an independent latching action, both must be pressed by the user to release the gate 21 to slide, and their opposing arrangement means this can be readily achieved by grasping them between forefinger and thumb as shown in FIG. 6. This figure also shows that the loop formed in the wire rope 27 may also conveniently be grasped, securing the body while the gate 21 is withdrawn, thus providing single-handed operation. The release of these two latch levers 24a, 24b and the sliding of the gate 21 comprise three independent actions that must each be performed to release the fastener 10, thus mitigating the possibility of an unintended release occurring. Furthermore, as the levers 24a, 24b are self-closing and the sliding gate 21 is spring-biased to its closed state, the fastener 10 locks automatically upon release by the user.

In the further embodiments of the invention that follow like numbers are used to refer to like components from the first embodiment.

FIG. 7 illustrates a second embodiment of the fastener 110 which is of like construction to the first embodiment 10 except for the loop in the wire rope 27, one end of the wire rope 127 is instead fixed to the end 15 by a permanent connection, such as by the end 15 of the body 11 being crimped directly to an end 51 of the wire rope 127. Using this embodiment to secure a length of the wire rope 127 in the recess 12 secure openable loop 128 is formed using the wire rope 127.

In the third embodiment or fastener 210 shown in FIG. 8, a D-ring 251 is received in the aperture 20 and connected to a textile web 55, as by a loop in the web 55 through the D-ring 251.

The fourth embodiment of the fastener 310 shown in FIGS. 9-15 employs like components to perform the same function but instead of the gate being closed by a compression spring, it is closed by a tension spring 123. With tension spring 123 fixed to the end 15 of the body 111 as by one hooked end extending about the loop of wire rope 27 and to the gate 121 by another hooked end received in a hole in the gate 121, the gate 121 is urged toward the end to its closed position (shown in FIGS. 9-15). The concavity 150 is disposed in an intermediate position between the axial ends of the gate 121 and is U-shaped so that in the closed position an integral tongue portion 60 of the gate 121 extends over the mouth of the recess 112.

Figure 22:
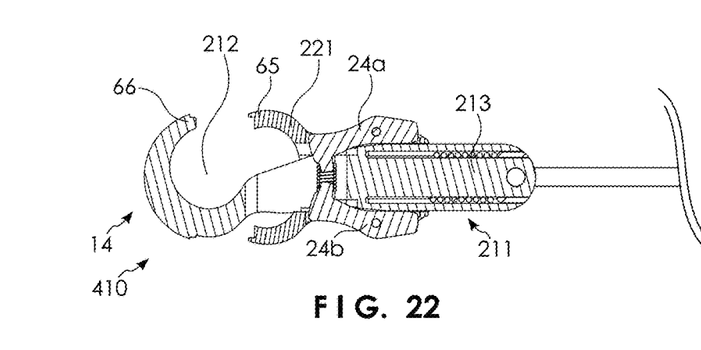

In another preferred embodiment shown in FIGS. 16-22, and perhaps best illustrated by FIG. 22, the hook-shaped end 14 of the fastener 410 and recess 212 defined thereby may have substantially larger transverse dimensions than the adjacent shank 213 of the body 211, as may be required depending on the application. To accommodate this geometry, instead of the gate lying over the mouth of the recess in the closed position, the gate 221 may have an interface 65 that abuts a complementary interface 66 on the body 221 at the end of the hook-shaped portion. These interfaces 65, 66 may have a stepped form that provides a degree of interlocking in the closed position whereby the gate 221 contributes to the stability of the hook-shaped end.

FIGS. 16-22 shows that the body 211 may include a head part 68 the projects radially outwardly of the shank 213 to provide bearing for one end of the compression spring 223 wherein the wire-rope-receiving aperture 220 extends through the head part 68.

Figure 23:
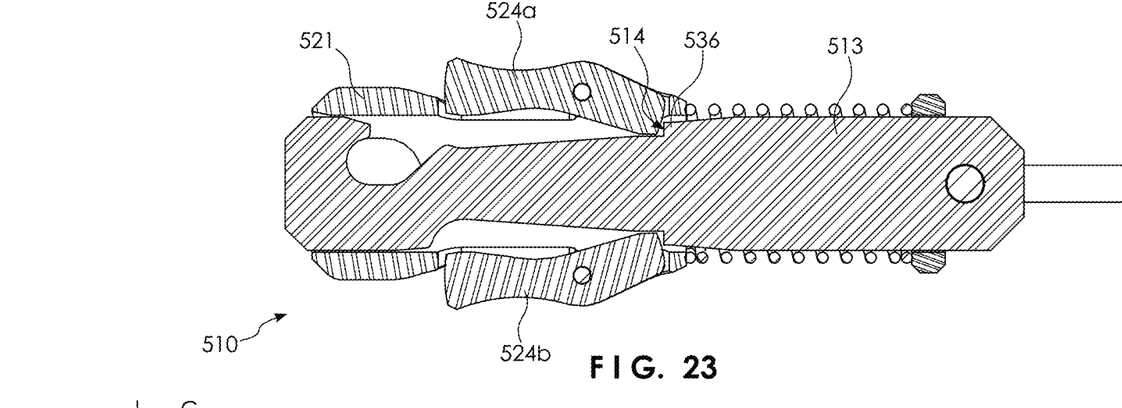
FIG. 23 shows a sixth embodiment of the fastener of the invention in longitudinal section.

FIG. 23 shows a sixth embodiment of the fastener 510 in which the latch levers 524a, 524b remain pivotally mounted to the gate 521, but where the biasing single spring 41 is replaced by two separate springs (not shown), such as torsion springs mounted about the respective latch pivots, each biasing a respective one of the latch levers 524a, 524b to its latched position, Advantageously, this avoids the need for the through-extending slot 18 in the shank 513. In addition, the gate 521 may be made free to rotate about the longitudinal axis of the shank, as the shoulder 536 defines an annular face 538 that lies in a transverse plane and which therefore abuts the latch levers 524a, 524b at any angle of relative rotation between the gate 121 and the shank 513 about the longitudinal axis.

Figure 24:
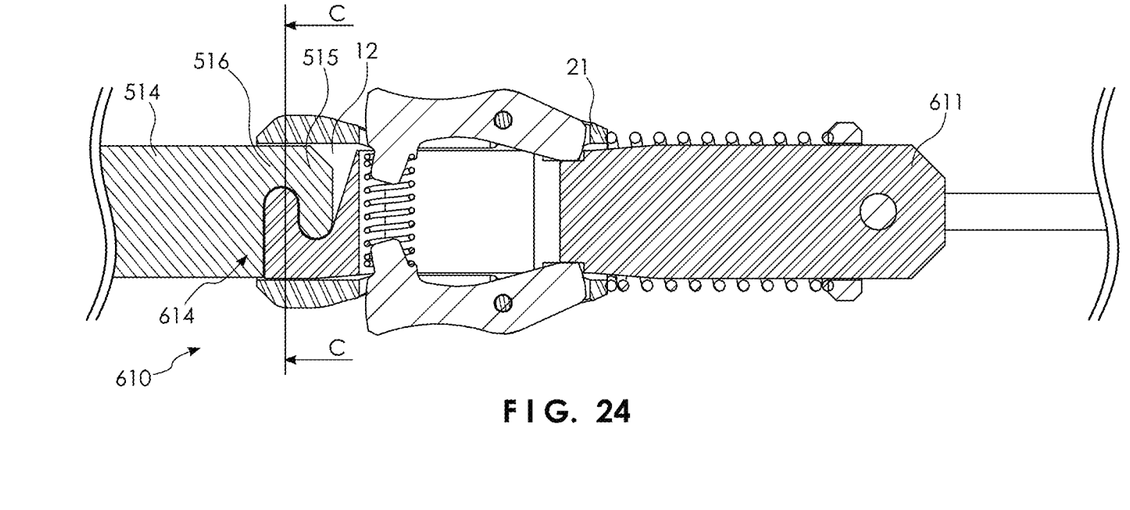
FIG. 24 shows a longitudinal section of a seventh embodiment of the fastener of the invention fixed to a complementary coupler received in one axial end of the gate.
Figure 25:
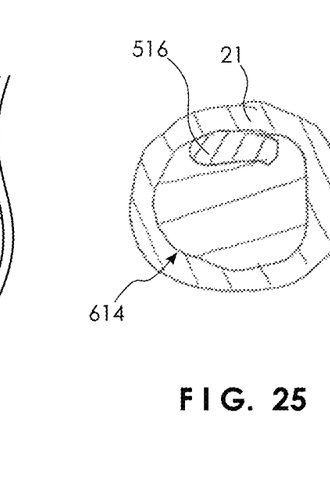
FIG. 25 is section CC indicated in FIG. 24.

A two-part coupling may comprise a fastener 610 and a complementary coupler 514 releasably fixable in one axial end of the gate 21, as shown in FIGS. 24 and 25.

Fastener 610 is like that of any of the preceding fasteners 10, 110, 210, 310, 410, 510 except for the shape of the end 614 of the elongate body 611, where there is an axially-extending channel in the hook-shaped end 614 that extends into the recess 12, where this channel receives an axially-extending portion 516 of the coupler 514. The coupler 514 has a hook-shaped end 515 complementary to both the gate 21 and the hook-shaped end 614 and is engaged therewith such that extending the gate 21 (to the position shown) secures the coupler 514 to protrude from the axial end of the gate 21. Although modified by the axially-extending channel, an elongate member received in the recess 12 and extending transversely, as to form the loop 128, remains fastened and cannot escape the recess 12 in the axial direction. By providing a coupler 514 on a tool, for instance, a fastener of the invention secured to a tether can be used for tethering the tool.

Aspects of the present invention have been described by way of example only and it should be appreciated that modifications and additions may be made thereto without departing from the scope thereof.

The invention claimed is:

1. A fastener for releasably securing a member, the fastener comprising:
   a body including a shank and a recess, the shank having a shank axis, the recess having a mouth and being configured for receiving the member;
   a gate mounted to slide axially on the shank along the shank axis between a closed position closing the mouth of the recess for retaining the member, and an open position;
   resilient means engaging the gate and the shank to urge the gate to the closed position, and
   a pair of latches, the latches mounted on opposing sides of the gate, wherein each said latch is self-closing, being urged to engage the body for holding the gate in the closed position, and is manually moveable to disengage from the body for releasing the gate from the closed position.

2. The fastener of claim 1 wherein the recess is disposed proximate one longitudinal end of the body.

3. The fastener of claim 1 wherein the recess is defined by a hook-shaped portion of the body, the hook-shaped portion optionally having a non-reentrant form.

4. The fastener of claim 3 further comprising a coupler having a hook-shaped end complementary to both the gate and the hook-shaped portion of the body, wherein the coupler is engaged with the fastener to protrude from an axial end of the gate and is secured by sliding the gate to the closed position.

5. The fastener of claim 1 wherein each said latch comprises a latch lever mounted by a pivot to rotate about a respective transverse pivot axis aligned transverse to the shank axis.

6. The fastener of claim 5 wherein the latch levers are elongated generally in a direction of the shank axis and each of the transverse pivot axis substantially lies in a transverse plane transverse to the shank axis.

7. The fastener of claim 6 wherein each of the transverse pivot axis is disposed intermediate opposite first and second longitudinal ends of the respective latch lever, one of the first and second ends of each of the latch lever abutting a shoulder on the shank.

8. The fastener of claim 7 further comprising a latch spring, and a slot that extends through the shank and is aligned with the shank axis, wherein the latch spring is received in the slot such that opposing ends of the latch spring abut respective ones of the latch levers to urge the one of the first and second ends inwardly to engage the shoulder.

9. The fastener of claim 5 wherein a one-piece retainer extends through each of the latch lever to define each pivot of the latch levers.

10. The fastener of claim 9 wherein channels in a periphery of the gate receive sections of the one-piece retainer.

11. The fastener of claim 9 wherein the one-piece retainer comprises a length of wire formed first in a U-shape with two parallel arms that are inserted through the latch levers before ends of the arms are bent together to form a loop to permanently retain the latch levers and latch spring.

12. The fastener of claim 1 wherein the resilient means comprises a helical spring that extends about the shank, one end of the helical spring engaging the gate and the other end engaging a fixture proximate one end of the shank.

13. The fastener of claim 12 wherein the fixture is held in an aperture that extends through the shank.

14. The fastener of claim 12 wherein the fixture comprises one end of an elongate flexible member.

15. The fastener of claim 12 wherein the fixture is held in an aperture that extends through the shank.

16. The fastener of claim 15 wherein the fixture comprises one end of an elongate flexible member.

17. A fastener for releasably securing a member, the fastener comprising:
a body including a shank and a recess, the recess configured for receiving the member and defined by a hook-shaped portion of the body;
a gate mounted to slide axially on the shank between a closed position closing a mouth of the recess for retaining the member, and an open position;
resilient means engaging the gate and the shank to urge the gate to the closed position, and a pair of latch levers, each said latch lever mounted by a respective pivot to rotate about a respective substantially transverse pivot axis, the latch levers mounted on opposing sides of the gate, wherein each said latch lever is elongated generally axially and is closed by a latch spring to engage the body for holding the gate in the closed position.

18. The fastener of claim 17 wherein a one-piece retainer extends through each said latch lever to define each said pivot of the latch levers.

19. The fastener of claim 18 wherein channels in a periphery of the gate receive sections of the one-piece retainer.

20. The fastener of claim 18 wherein the one-piece retainer comprises a length of wire formed first in a U-shape with two parallel arms that are inserted through the latch levers before ends of the arms are bent together to form a loop to permanently retain the latch levers and the latch spring.

21. The fastener of claim 17 wherein the resilient means comprises a helical spring that extends about the shank, one end of the helical spring engaging the gate and the other end engaging a fixture proximate one end of the shank.

22. The fastener of claim 17 further comprising a coupler having a hook-shaped end complementary to both the gate and the hook-shaped portion of the body, wherein the coupler is engaged with the fastener to protrude from an axial end of the gate and is secured by sliding the gate to the closed position.

\* \* \* \* \*